(12) United States Patent
Rusch et al.

(10) Patent No.: US 9,997,981 B2
(45) Date of Patent: Jun. 12, 2018

(54) ELECTRIC MACHINE

(71) Applicant: AUDI AG, Ingolstadt (DE)

(72) Inventors: Josef Rusch, Grossmehring (DE);
Bastian Heidler, Kranzberg (DE)

(73) Assignees: AUDI AG, Ingolstadt (DE);
KARLSRUHER INSTITUT FÜR TECHNOLOGIE, Karlsruhe (DE)

( * ) Notice: Subject to any disclaimer, the term of this patent is extended or adjusted under 35 U.S.C. 154(b) by 275 days.

(21) Appl. No.: 14/966,492

(22) Filed: Dec. 11, 2015

(65) Prior Publication Data
US 2016/0172925 A1 Jun. 16, 2016

(30) Foreign Application Priority Data
Dec. 12, 2014 (DE) .................. 10 2014 018 449

(51) Int. Cl.
| | | |
|---|---|---|
| H02K 11/40 | (2016.01) | |
| H02K 5/167 | (2006.01) | |
| H02K 5/173 | (2006.01) | |
| H02K 7/08 | (2006.01) | |

(52) U.S. Cl.
CPC .......... *H02K 11/40* (2016.01); *H02K 5/1672* (2013.01); *H02K 5/1732* (2013.01); *H02K 7/083* (2013.01)

(58) Field of Classification Search
CPC ...... H02K 11/40; H02K 7/083; H02K 5/1672; H02K 5/1732
See application file for complete search history.

(56) References Cited

U.S. PATENT DOCUMENTS

| | | | |
|---|---|---|---|
| 4,499,592 A | 2/1985 | Brettschneider et al. | |
| 4,515,417 A | 5/1985 | Shiraishi | |
| 4,585,963 A * | 4/1986 | Wilkinson, Jr. ... | G11B 19/2009 29/598 |
| 5,454,724 A * | 10/1995 | Kloeppel ............... | F16C 19/52 310/90 |
| 5,914,547 A | 6/1999 | Barahia et al. | |
| 6,670,733 B2 * | 12/2003 | Melfi .................... | H02K 11/01 310/68 R |
| 6,987,338 B1 * | 1/2006 | Lavasser .................. | A47L 5/12 15/412 |
| 7,071,589 B2 * | 7/2006 | Bramel ................ | F16C 19/163 198/952 |

(Continued)

FOREIGN PATENT DOCUMENTS

| | | |
|---|---|---|
| CN | 103595171 A | 2/2014 |
| CN | 203554153 U | 4/2014 |

(Continued)

OTHER PUBLICATIONS

Chinese Search Report dated Nov. 3, 2017 with respect to counterpart Chinese patent application 2015109247131.

(Continued)

*Primary Examiner* — Dang Le
(74) *Attorney, Agent, or Firm* — Henry M. Feiereisen LLC

(57) ABSTRACT

An electric machine includes a housing, a driveshaft and a rotor which is mounted on the driveshaft. The driveshaft is supported on the housing by at least one rolling-contact bearing and in addition by an electrically-conductive slide bearing which also establishes an electric connection between the driveshaft and the housing.

25 Claims, 1 Drawing Sheet

(56) References Cited

U.S. PATENT DOCUMENTS

| | | | |
|---|---|---|---|
| 7,365,458 B2 * | 4/2008 | Yoshida | ............ H02K 11/40 310/68 R |
| 2002/0121821 A1 | 9/2002 | Ritter | |
| 2007/0009095 A1 | 1/2007 | Turaga et al. | |
| 2009/0096317 A1 | 4/2009 | Sasaki et al. | |
| 2013/0038182 A1 | 2/2013 | Obata et al. | |
| 2015/0008721 A1 | 1/2015 | Vogler et al. | |

FOREIGN PATENT DOCUMENTS

| | | |
|---|---|---|
| CN | 203933231 U | 11/2014 |
| DE | 400490 A | 8/1924 |
| DE | 102006031156 A1 | 1/2007 |
| DE | 102006007434 A1 | 8/2007 |
| DE | 102012204795 A1 | 9/2013 |
| DE | 102013201719 A1 | 8/2014 |
| EP | 0 063 840 B1 | 10/1985 |
| EP | 0063840 B1 | 10/1985 |
| WO | WO2004/038241 A1 | 5/2004 |

OTHER PUBLICATIONS

Translation of Chinese Search Report dated Nov. 3, 2017 with respect to counterpart Chinese patent application 2015109247131.

* cited by examiner

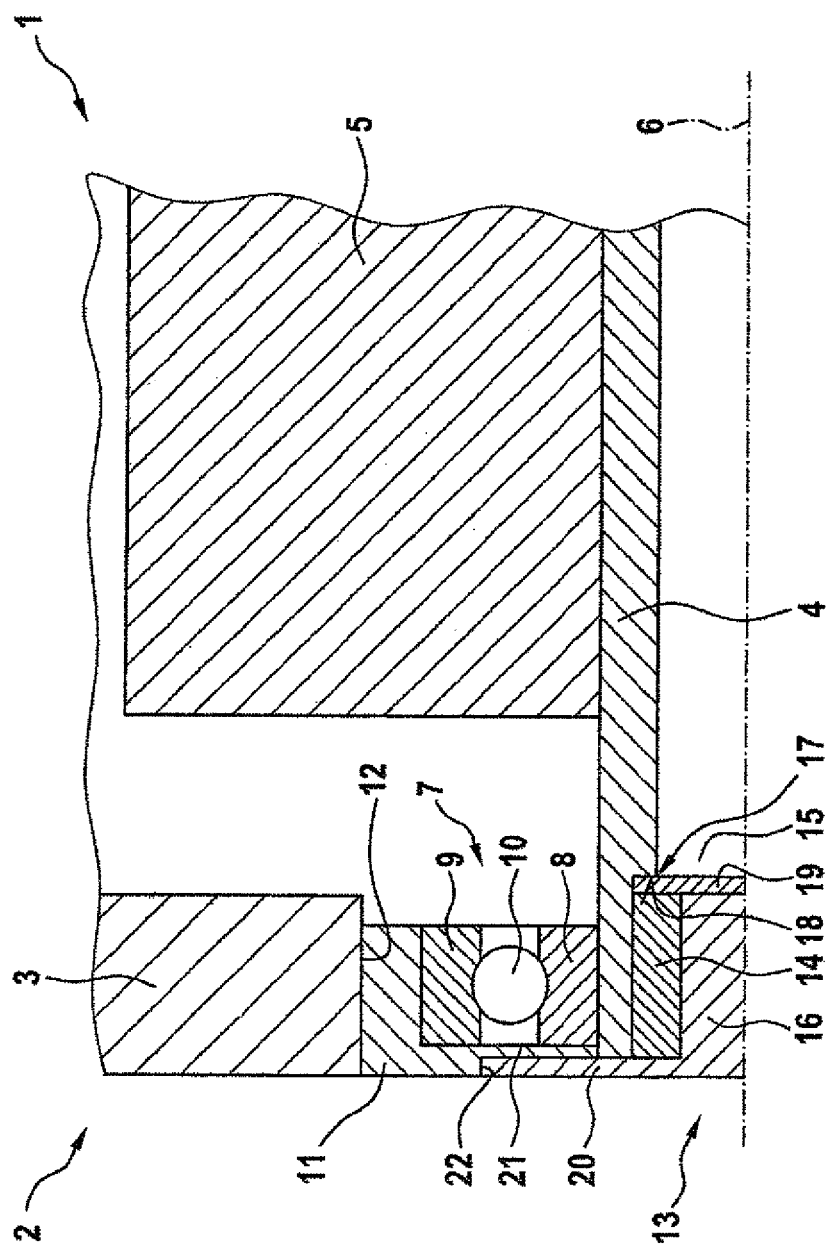

ELECTRIC MACHINE

CROSS-REFERENCES TO RELATED APPLICATIONS

This application claims the priority of German Patent Application, Serial No. 10 2014 018 449.8, filed Dec. 12, 2014, pursuant to 35 U.S.C. 119(a)-(d), the disclosure of which is incorporated herein by reference in its entirety as if fully set forth herein.

BACKGROUND OF THE INVENTION

The present invention relates to an electric machine.

The following discussion of related art is provided to assist the reader in understanding the advantages of the invention, and is not to be construed as an admission that this related art is prior art to this invention.

Electric machines find application, for example, in the automobile industry and form in particular part of a drive device, e.g. hybrid drive device. The electric machine may operate, for example, as a starter for a drive unit, such as an internal combustion engine, and/or as generator. When a hybrid drive device is involved, the electric machine provides a further drive unit in addition to the afore-mentioned drive unit, with both drive units being operatively connected in such a way as to jointly provide a drive torque, at least temporarily. The drive torque is typically directed to a drive of a motor vehicle. Of course, the electric machine may be used in any suitable way, for example as three-phase machine.

The electric machine includes a driveshaft and a rotor mounted in fixed rotative engagement on the driveshaft. As a result, the rotor is supported by the driveshaft for rotation about a rotation axis, i.e. the rotation axis of the driveshaft. The rotor interacts with a stator which can be disposed in surrounding relationship, at least in some sections, in circumferential direction with respect to the rotation axis. The rotor can have at least one electromagnet and/or at least one permanent magnet. The stator has typically at least one electromagnet. The rotor and thus the driveshaft can be caused to rotate in conventional manner. The driveshaft is typically the output shaft of the electric machine and provides a drive torque of the electric machine. Typically, the driveshaft is supported in a housing of the electric machine via a rolling-contact bearing.

When high rotation speeds of the driveshaft are involved, a lubricating film forms in the rolling-contact bearing, for example between rolling bodies or between rolling bodies and raceways. This lubricating film electrically insulates the rolling-contact bearing so that the driveshaft and thus also the rotor are electrically insulated from the housing. This can cause interference voltage on the driveshaft. This interference voltage, also called shaft voltage, can be in the order of several volts and is the source for bearing currents and EMC incompatibilities of the electric machine or the motor vehicle in which the electric machine is installed.

It would therefore be desirable and advantageous to provide an improved electric machine which addresses these prior art problems and which runs smoothly and with little generation of vibrations while still being reliable in operation over a long service life.

SUMMARY OF THE INVENTION

According to one aspect of the present invention, an electric machine includes a housing, a driveshaft, a rotor mounted on the driveshaft, at least one rolling-contact bearing configured to support the driveshaft on the housing, and an electrically-conductive slide bearing configured to additionally support the driveshaft on the housing and to establish an electric connection between the driveshaft and the housing.

The present invention resolves prior art problems by providing in addition to the rolling-contact bearing a slide bearing which, like the rolling-contact bearing, is intended to support the driveshaft in the housing but in addition establishes an electric connection between the driveshaft and the housing. While both, the rolling-contact bearing and the slide bearing are thus configured to support the driveshaft, the rolling-contact bearing still absorbs a major portion of the force imposed on the driveshaft, especially forces in radial direction. Currently preferred is the configuration of the rolling-contact bearing and the slide bearing such that the rolling-contact bearing absorbs all forces in radial direction.

The slide bearing is configured to be electrically conductive and in particular to permanently establish the electric connection between the driveshaft and the housing, i.e. at any rotation angle position of the driveshaft in relation to the housing. The provision of the electrically conductive slide bearing ensures the presence of the electric connection of the driveshaft with the housing so that the rolling-contact bearing, which is temporarily non-conducting, is bridged. Thus, the presence of an electric contact between the driveshaft and thus the rotor, on one hand, and the housing, on the other hand, is ensured at any rotation speed. Advantageously, the housing is grounded. Currently preferred is a configuration in which the housing is configured in such a way that the driveshaft and the rotor are also grounded via the electrically conductive slide bearing. As a result, the presence of electric interference voltages upon the driveshaft is eliminated. EMC compatibility can be maintained in the motor vehicle and the service life of the electric machine and the rolling-contact bearing is significantly improved.

According to another advantageous feature of the present invention, the rolling-contact bearing can have at least one region which is made of a material that is electrically non-conductive or non-conducting so that the rolling-contact bearing is electrically insulating and there is no electric connection between the driveshaft and the housing via the rolling-contact bearing. Currently preferred is a configuration in which the rolling-contact bearing or all rolling-contact bearings of the electric machine are electrically insulating, whereas the slide bearing is electrically conductive.

According to another advantageous feature of the present invention, the slide bearing can have a slide bearing bush and a slide bearing pin configured for engagement in the slide bearing bush. The slide bearing thus is composed of two components, i.e. the slide bearing bush and the slide bearing pin. Both these components represent the sliding partners of the slide bearing, i.e. the slide bearing pin is rotatably arranged in the slide bearing bush. Advantageously, the slide bearing pin has at least one region that engages the slide bearing bush and has an outer dimension which corresponds to or is slightly smaller than the inner dimension of the slide bearing bush in the region which is engaged by the slide bearing pin. Advantageously, the slide bearing is configured such that the slide bearing pin is in permanent contact with the slide bearing bush so that the slide bearing pin is permanently electrically connected with the slide bearing bush.

According to another advantageous feature of the present invention, the driveshaft can have at least one region which is formed as a hollow shaft, with the slide bearing bush being arranged in a cavity of the hollow shaft. in this way, there is no need to make the electric machine bulkier in axial direction in order to provide space for the slide bearing. Advantageously, the rolling-contact bearing adjoins an outer circumference of the driveshaft, i.e. the rolling-contact bearing embraces the driveshaft in circumferential direction at least in part or in its entirety. Conversely, the slide bearing has at least one region received in the driveshaft or hollow shaft.

According to another advantageous feature of the present invention, the driveshaft can have a shoulder, with the slide bearing bush being supported on the shoulder in an axial direction relative to a rotation axis of the driveshaft. The term "shoulder" relates hereby to a sudden change on the dimension of the driveshaft, as a result of which a contact surface is created for support of the slide bearing bush in the axial direction. When the slide bearing or the slide bearing bush is provided on an outer circumference of the driveshaft, the shoulder is also formed on the outer circumference. Advantageously, the shoulder is, however, in the driveshaft so that the driveshaft is configured as stepped hollow shaft or has a stepped bore.

According to another advantageous feature of the present invention, the shoulder or contact surface formed by the shoulder can be oriented in a direction to the adjacent end of the driveshaft. Accordingly, the side bearing bush can be placed over the driveshaft or pushed into the driveshaft until further movement of the slide bearing bush is prevented by the shoulder or contact surface. For example, the slide bearing bush rests directly upon the shoulder or contact surface. Of course, interposition of a further element between the slide bearing bush and shoulder may, optionally, also be provided.

According to another advantageous feature of the present invention, the slide bearing can have a slide bearing cover disposed adjacent to the slide bearing bush and clamped between the shoulder and the slide bearing bush. The slide bearing cover can, for example, close off the slide bearing in axial direction. The slide bearing cover may be arranged to separate the cavity of the hollow shaft, where the slide bearing bush is disposed, from a further cavity adjacent to the first-mentioned cavity. Advantageously, the slide bearing cover can have in radial direction a dimension, sufficient to rest in circumferential direction continuously on the hollow shaft or inner circumference of the hollow shaft. Advantageously, the slide bearing cover is clamped between the shoulder or contact surface and the slide bearing bush, i.e. the slide bearing cover rests permanently upon the shoulder and the slide bearing bush.

According to another advantageous feature of the present invention, a fastening collar can be connected to the slide bearing pin for securing the slide bearing pin. For example, the slide bearing pin may be formed in one piece with and/or of same material as the fastening collar. Of course, any type of securement is conceivable that secures the slide bearing pin to the fastening collar. The fastening collar is provided to fasten the slide bearing pin to the housing. Advantageously, the fastening collar can be configured to project from the slide bearing pin in radial direction outwards and to span an end face of the driveshaft. The fastening collar may also be dimensioned to project in radial direction outwards beyond the driveshaft.

According to another advantageous feature of the present invention, a rolling-contact bearing bush can be provided to receive the rolling-contact bearing, with the fastening collar resting against the rolling-contact bearing bush and secured to the housing via the rolling-contact bearing bush. In this way, the rolling-contact bearing bush embraces the driveshaft in circumferential direction, at least in part or in its entirety, with the rolling-contact bearing disposed in radial direction between the rolling-contact bearing bush and the driveshaft. The rolling-contact bearing has, for example, an inner raceway, an outer raceway, and several rolling bodies which are rotatably arranged between the inner and outer raceways. The rolling bodies may be supported in a rolling-contact bearing cage and can be of any configuration, for example in the form of balls, cylinders, cones, needles, or barrels.

The inner raceway may be configured to permanently rest upon the driveshaft or be fastened thereto, rigidly and/or permanently. Thus, as the driveshaft rotates, the raceway is also caused to rotate. In contrast thereto, the outer raceway is associated to the rolling-contact bearing bush and may be secured thereto, rigidly and/or permanently. Thus, the rolling-contact bearing bush restrains the rolling-contact bearing or securement of the rolling-contact bearing to the housing. In addition, the rolling-contact bearing bush provides also a securement of the fastening collar and thus of the slide bearing. For that purpose, the fastening collar rests on the rolling-contact bearing bush or is fastened thereto. The fastening collar is therefore secured to the housing or fixed in place in relation thereto.

According to another advantageous feature of the present invention, the rolling-contact bearing bush can have a radial projection arranged adjacent to the rolling-contact bearing, with the fastening collar being secured on the radial projection. The radial projection extends in the direction of the driveshaft, i.e. inwards in radial direction. Viewed in radial direction, the radial projection has at least one region next to the rolling-contact bearing. Advantageously, the radial projection spans in radial direction a major portion of the rolling-contact bearing and projects to just shy of the driveshaft. The radial projection extend at least in radial direction to a location next to the rolling-contact bearing and/or next to the inner raceway of the rolling-contact bearing. Advantageously, the radial projection is configured continuously in circumferential direction, although a configuration may also be conceivable in which the radial projection has several radial arms in circumferential spaced-apart relationship, advantageously evenly dispersed about the circumference of the driveshaft.

Whereas the radial projection extends inwardly in radial direction, the fastening collar extends outwardly in radial direction. Advantageously, the fastening collar and the radial projection overlap one another and can have areas disposed coextensively to one another and connected with one another. The connection between the fastening collar and the radial projection may be realized by any suitable construction, for example formfittingly and/or via a material-based joint, e.g. bonding or welding.

According to another advantageous feature of the present invention, the radial projection and the fastening collar can be made of same material. Any material with good electric conductivity is suitable. Of course, the fastening collar and the radial projection may also be formed in one piece. The electric connection between the driveshaft and thus of the rotor with the housing is realized via the slide bearing bush, the slide bearing pin, the fastening collar, and the radial projection. For this purpose, the radial projection is electrically connected to the housing of the electric machine, whereas the slide bearing bush is electrically connected with the driveshaft.

According to another advantageous feature of the present invention, the housing can have a bearing shield, with the rolling-contact bearing bush being arranged in the bearing shield. The bearing shield is a component of the housing and can delimit the electric machine in axial direction. Advantageously, provision can be made for two bearing shields in opposite relationship on both ends of the rotor, respectively, for providing a support of the driveshaft. The bearing shield has, for example, a bearing opening in coaxial relationship to the driveshaft for arrangement of the rolling-contact bearing bush.

According to another advantageous feature of the present invention, the slide bearing can be arranged in overlapping relationship to the rolling-contact bearing, when viewed in an axial direction. This ensures a reliable support of the driveshaft in radial direction. In a longitudinal section through the electric machine, i.e. an intersection through the rotation axis of the driveshaft, the slide bearing and the rolling-contact bearing assume in at least one area a same axial position or same axial positions.

According to another advantageous feature of the present invention, the rolling-contact bearing can be configured to extend over its entire length in axial direction in a region in which also the slide bearing is disposed. Thus, the rolling-contact bearing does not project in axial direction beyond the slide-bearing. In such a configuration, the slide bearing can have a greater extension in axial direction than the rolling-contact bearings. Of course, a reverse variant may also be conceivable.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 shows a longitudinal section of the electric machine according to the present invention.

DETAILED DESCRIPTION OF PREFERRED EMBODIMENTS

The depicted embodiment is to be understood as illustrative of the invention and not as limiting in any way. It should also be understood that the FIGURE is may not necessarily be to scale. In certain instances, details which are not necessary for an understanding of the present invention or which render other details difficult to perceive may have been omitted.

Turning now to FIG. 1, there is shown a longitudinal section of the electric machine according to the present invention, generally designated by reference numeral 1. The electric machine 1 includes a housing 2, shown here only in part. The housing 2 includes a bearing shield 3. Supported in the housing 2 is a driveshaft 4 on which a rotor 5 is arranged. The rotor 5 may be connected or mounted to the driveshaft 4 rigidly and/or permanently. The driveshaft 4 and thus the rotor 5 are supported in the housing 2 for rotation about a rotation axis 6. The support of the driveshaft 4 is hereby realized by at least one rolling-contact bearing 7, which is shown here by way of example in the form of a ball bearing. Of course, any other type of rolling-contact bearing 7 may be employed.

The rolling-contact bearing 7 has an inner raceway 8, an outer raceway 9, and rolling bodies 10. Although not shown in FIG. 1, the rolling bodies 10 may be supported by a rolling-contact bearing cage between the inner raceway 8 and the outer raceway 9. The inner raceway 8 is connected in fixed rotative engagement with the driveshaft 4, whereas the outer raceway 9 is arranged in fixed rotative engagement in a rolling-contact bearing bush 11. The rolling-contact bearing bush 11 is placed in a bearing opening 12 which is formed in the bearing shield 3 of the housing 2. The bearing opening 12 is advantageously configured in coaxial relation to the driveshaft 4.

In addition to the rolling-contact bearing 7, provision is made for a slide bearing 13 which is electrically conductive to establish an electric connection between the driveshaft 4 and the housing 2, in particular the bearing shield 3. The slide bearing 13 has a slide bearing bush 14 which is arranged in a cavity 15 of the driveshaft 4, formed as hollow shaft. The slide bearing bush 14 is mounted rigidly and/or permanently with respect to the driveshaft 4, i.e. the slide bearing bush 14 is connected in fixed rotative engagement with the driveshaft 4. In addition, the slide bearing bush 14 is electrically connected with the driveshaft 4. Suitably, the driveshaft 4 is made of electrically conductive material so as to realize an electric connection between the rotor 5 and the slide bearing 13 and thus the housing 2.

The slide bearing 13 includes a slide bearing pin 16 which engages the slide bearing bush 14 and is rotatably mounted therein. To prevent migration of the slide bearing bush 14, the driveshaft 4 is provided with a shoulder 17 to form a contact surface 18. The slide bearing bush 14 can be supported on the contact surface 18, in particular via a slide bearing cover 19. The slide bearing cover 19 is arranged, as viewed in axial direction with respect to the rotation axis 6, between the shoulder 17 and the slide bearing bush 14. Thus, the slide bearing cover 19 is clamped between the slide bearing bush 14 and the shoulder 17 or contact surface 18.

Connected with the slide bearing pin 16 is a fastening collar 20 which extends outwards in radial direction with respect to the rotation axis 6. The slide bearing pin 16 and the fastening collar 20 can be made of same material and/or formed in one piece. Both, the slide bearing pin 16 and the fastening collar 20 are made of electrically conductive material. The fastening collar 20 extends in radial direction beyond the driveshaft 4 to such an extent as to span the rolling-contact bearing 7 in radial direction, at least in part. For example, the fastening collar 20 is sized to extend at least over the inner raceway 8 and/or to reach directly to the outer raceway 9.

The fastening collar 20 is connected with a radial projection 21 of the rolling-contact bearing bush 11. The radial projection 21 is advantageously secured to the rolling-contact bearing bush 11, in particular secured in an electrically conductive manner. For example, the rolling-contact bearing bush 11 has a notch 22 which is engaged, at least in part, by the fastening collar 20. Provision may be made to make the fastening collar 20 and the rolling-contact bearing bush 11 of same material. In any event, the material for the rolling-contact bearing bush 11 and the material for the fastening collar 20 are electrically conductive so as to be able to establish an electric connection between the driveshaft 4 and the housing 2 via the slide bearing 13 and the rolling-contact bearing bush 11. Of course, provision may also be made to directly electrically connect the fastening collar 20 to the housing, for example by sizing the fastening collar 20 to directly extend up to the housing 2 or by using an electric line to establish the electric connection.

In the non-limiting example shown in FIG. 3, the slide bearing 13 is arranged in axial direction in overlapping relation to the rolling-contact bearing 7. The slide bearing 13 has hereby, for example, a greater extension in axial direction than the rolling-contact bearing 7. Suitably, the housing 2 or at least the bearing shield 3 are electrically grounded. As a result, the electric connection via the slide bearing 13 is able to prevent the presence of electric interference voltages onto the driveshaft 4. This results in beneficial EMC behavior. Moreover, service life of the electric machine 1, in particular of the rolling-contact bearing 7 is improved.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electric machine, comprising:
   a housing;
   a driveshaft;
   a rotor mounted on the driveshaft;
   at least one rolling-contact bearing configured to support the driveshaft on the housing; and
   an electrically-conductive slide bearing configured to additionally support the driveshaft on the housing and to establish an electric connection between the driveshaft and the housing, said slide bearing having a slide bearing bush and a slide bearing pin configured for engagement into the slide bearing bush, said slide bearing bush being supported on a shoulder of the driveshaft in an axial direction relative to a rotation axis of the driveshaft,
   wherein the slide bearing has a slide bearing cover disposed adjacent to the slide bearing bush and clamped between the shoulder and the slide bearing bush.

2. The electric machine of claim 1, wherein the housing is grounded.

3. The electric machine of claim 1, wherein the housing is configured such that the driveshaft and the rotor are grounded via the electrically conductive slide bearing.

4. The electric machine of claim 1, wherein the rolling-contact bearing has at least one region which is made of a material that is electrically non-conductive.

5. The electric machine of claim 1, wherein the slide bearing pin has at least one region that engages the slide bearing bush and has an outer dimension which corresponds to or is slightly smaller than an inner dimension of the slide bearing bush in a region which is engaged by the slide bearing pin.

6. The electric machine of claim 1, wherein the slide bearing pin is in permanent contact with the slide bearing bush so that the slide bearing pin is connected permanently electrically connected with the slide bearing bush.

7. The electric machine of claim 1, wherein the driveshaft has at least one region formed as a hollow shaft, said slide bearing bush being arranged in a cavity of the hollow shaft.

8. The electric machine of claim 1, wherein the slide bearing is arranged in overlapping relationship to the rolling-contact bearing, when viewed in an axial direction.

9. The electric machine of claim 1, wherein the rolling-contact bearing is configured to extend over its entire length in an axial direction in a region in which also the slide bearing is disposed.

10. The electric machine of claim 1, wherein the slide bearing cover has in a radial direction a dimension, sufficient to rest in circumferential direction continuously on an inner circumference of the driveshaft.

11. The electric machine of claim 1, further comprising a fastening collar connected to the slide bearing pin for securing the slide bearing pin.

12. An electric machine, comprising:
    a housing;
    a driveshaft;
    a rotor mounted on the driveshaft;
    at least one rolling-contact bearing configured to support the driveshaft on the housing;
    an electrically-conductive slide bearing configured to additionally support the driveshaft on the housing and to establish an electric connection between the driveshaft and the housing, said slide bearing having a slide bearing bush and a slide bearing pin configured for engagement into the slide bearing bush;
    a fastening collar connected to the slide bearing pin for securing the slide bearing pin; and
    a rolling-contact bearing bush configured to receive the rolling-contact bearing, said fastening collar resting against the rolling-contact bearing bush and secured to the housing via the rolling-contact bearing bush.

13. The electric machine of claim 12, wherein the driveshaft has a shoulder, said slide bearing bush being supported on the shoulder in an axial direction relative to a rotation axis of the driveshaft.

14. The electric machine of claim 13, wherein the shoulder is oriented in a direction to an adjacent end of the driveshaft.

15. The electric machine of claim 12, wherein the rolling-contact bearing bush has a radial projection arranged adjacent to the rolling-contact bearing, said fastening collar being secured on the radial projection.

16. The electric machine of claim 12, wherein the radial projection and the fastening collar are made of same material.

17. The electric machine of claim 12, wherein the housing has a bearing shield, said rolling-contact bearing bush being arranged in the bearing shield.

18. The electric machine of claim 12, wherein the housing is grounded.

19. The electric machine of claim 12, wherein the housing is configured such that the driveshaft and the rotor are grounded via the electrically conductive slide bearing.

20. The electric machine of claim 12, wherein the rolling-contact bearing has at least one region which is made of a material that is electrically non-conductive.

21. The electric machine of claim 12, wherein the slide bearing pin has at least one region that engages the slide bearing bush and has an outer dimension which corresponds to or is slightly smaller than an inner dimension of the slide bearing bush in a region which is engaged by the slide bearing pin.

22. The electric machine of claim 12, wherein the slide bearing pin is in permanent contact with the slide bearing bush so that the slide bearing pin is connected permanently electrically connected with the slide bearing bush.

23. The electric machine of claim 12, wherein the driveshaft has at least one region formed as a hollow shaft, said slide bearing bush being arranged in a cavity of the hollow shaft.

24. The electric machine of claim 12, wherein the slide bearing is arranged in overlapping relationship to the rolling-contact bearing, when viewed in an axial direction.

25. The electric machine of claim 12, wherein the rolling-contact bearing is configured to extend over its entire length in an axial direction in a region in which also the slide bearing is disposed.

* * * * *